UNITED STATES PATENT OFFICE.

HENRY BLOUNT HUNTER, OF NORFOLK, VIRGINIA.

PROCESS OF MAKING MAGNESIUM SALTS AND AMMONIA.

932,130.  Specification of Letters Patent.  Patented Aug. 24, 1909.

No Drawing.  Application filed December 11, 1905.  Serial No. 291,338.

*To all whom it may concern:*

Be it known that I, HENRY BLOUNT HUNTER, a citizen of the United States, residing at Norfolk, Norfolk county, Virginia, have invented a certain new and useful Process for Simultaneously Manufacturing Soluble Magnesium Salts and Ammonia, of which the following is a specification.

This invention relates to a process of manufacturing simultaneously Epsom salts ($MgSO_4, 7H_2O$) or other magnesium salts and ammonia ($NH_3$) and has for its object to render the process of manufacturing these useful chemical bodies more expeditious, to avoid the production of useless side products, as has been the case in processes heretofore employed, and to avoid the alternative difficult process of purification by distillation or otherwise of crude ammoniacal liquor.

The process which I have devised to accomplish these highly economic and desirable results is based upon the following chemical reaction:

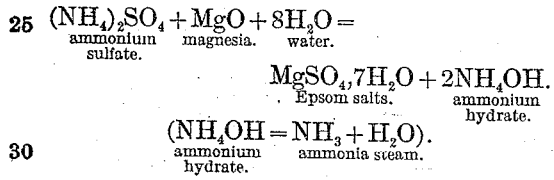

or a similar reaction with ammonia salts other than the sulfate.

In practice I mix in a closed vessel approximately molecular proportions of ammonium sulfate and magnesium oxid in a sufficient quantity of water, not only to cause a reaction but to give a working quantity of liquid, which is subsequently partially distilled off with the ammonia. These materials are placed in an iron vessel which may or may not be provided with a stirring apparatus and which is heated either by closed or open coils, or a steam jacket, or other suitable means. The heat is applied in an increasing amount as the operation progresses. The reaction increases with the application of heat and the ammonia gas which is produced is carried off through a suitable pipe connection from which it is purified, dried and compressed in the usual manner. The gas that is carried off from the iron retort or generator is ammonia gas, $NH_3$. This ammonia gas is allowed to go over at an increasing temperature until finally the amount of steam or water vapor that goes over with the ammonia is so great that it is advisable, or necessary, to condense it in the form of aqua ammonia. This process is continued until there finally is left in the retort nothing but the magnesium salts in solution. This magnesium salt solution is withdrawn from the retort or generator and then purified and the salts crystallized from it in the usual way.

It will be seen that by my process I make economic use of all the ingredients employed in the reaction and that all of my final products are commercially valuable, and are produced in quantities sufficient to prevent an increase in price of the final products. Besides this, the contents of the generator are in solution, whereas, by the old method of using oxid of calcium, the contents consist of an insoluble calcium sulfate, which clogs the generators and constitutes a useless waste product, which must be disposed of at some expense.

In carrying out my process I use either ammonium sulfate or other salts of ammonia, particularly ammonium chlorid. In the former case the by-product remaining in solution after the distillation of ammonia will be Epsom salts and in the latter case the final product would be magnesium chlorid, which is of considerable commercial importance.

It will readily be seen from the above description that my invention, looking at it from the point of an accomplished fact, differs from the older process mainly in the use of magnesium oxid in the place of oxid of calcium, but this not only produces a valuable side product, it provides a more satisfactory working method from a physical standpoint as well. The mere working out of the reaction was a comparatively simple thing as compared to the difficulties which I encountered in devising the process for employing the theoretically possible reaction. The selection of the proper material and the proper treatment thereof furnished the greatest difficulties, which I was finally able to overcome by using the process above described.

Having now fully disclosed my invention, what I desire to claim is:

The process of simultaneously producing ammonia and a soluble magnesium salt, which consists in mixing magnesium oxid and an ammonium salt with water, then gradually raising the temperature of the mixture, removing ammonia gas during the first stages of the operation storing it under pressure and removing a mixture of steam and ammonia gas during the later stages, condensing this mixture to form aqua ammonia, and crystallizing the magnesium salt solution which remains after the removal of the ammonia gas and steam.

In testimony whereof, I have hereunto signed my name in the presence of two subscribing witnesses.

HENRY BLOUNT HUNTER.

Witnesses:
 HANS V. BRIESEN,
 JOHN LOTKA.